J. G. Perry.
Meat Cutter.
N°. 88,667. Patented Apr. 6, 1869.
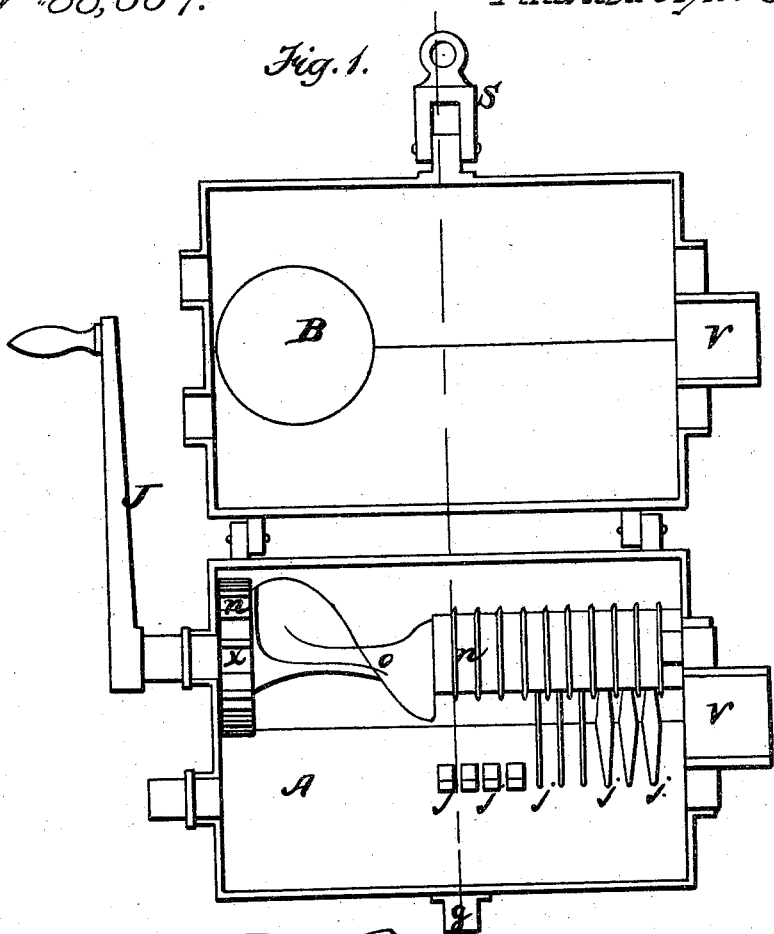
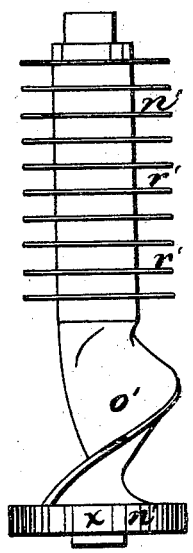
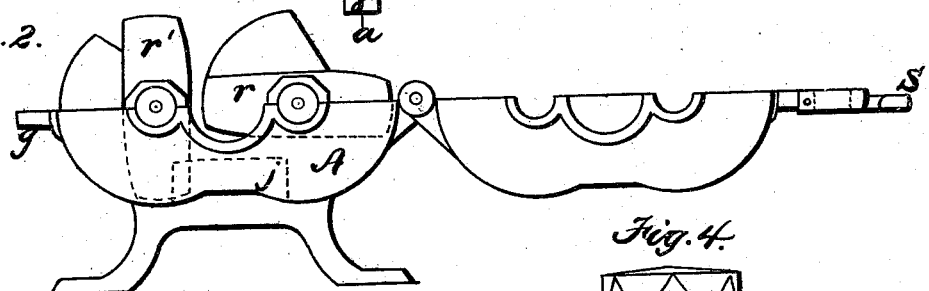
Witnesses
Elisha J. Clarke
Hattie E. Perry
Inventor
John G. Perry

JOHN G. PERRY, OF KINGSTON, RHODE ISLAND.

Letters Patent No. 88,667, dated April 6, 1869.

IMPROVED MEAT-CUTTER.

The Schedule referred to in these Letters Patent and making part of the same.

*To all whom it may concern:*

Be it known that I, JOHN G. PERRY, of Kingston, in the county of Washington, in the State of Rhode Island, have invented a new and useful Improvement in Machines for Cutting Meat; and do hereby declare the following to be a full and correct description thereof, reference being had to the accompanying drawings, making part of this specification, and to the letters and numbers of reference marked thereon, similar letters and numbers being used in all the figures to denote the same part.

In these drawings—

Figure 1 is a view of the meat-cutter with the case open, and one of the cutting-cylinders removed, to show the projections in the bottom of the case.

Figure 2 is a cross-section taken through in the direction of the red line $a$, in fig. 1.

Figure 3 is one of the cutting-cylinders.

Figure 4 is a view of the studs, or projections, as made in a block separate from the case.

The nature of my improvement consists in making a series of studs, or projections in the bottom of the case of a double-cylindered meat-cutter, in combination with knives and feeders, as hereinafter described.

The construction is as follows:

A is the case, made in the shape of two hollow cylinders, placed side by side, and opening into each other, the whole being divided into an upper and lower half, horizontally through the middle, and secured together by hinges on one side, and a catch $s'$, and a projection, $g$, on the other.

Two bearings are made in each end of the case, in the centre of the circle of each part, in which are placed two shafts, having the feed-screws $o$ $o'$, the driving-gear $n$ $n'$, and the knives $r$ $r'$ upon them, and the crank J upon the outer end of one of them.

B is the hopper, to feed the meat into the machine, and

V an opening, at which it is discharged when sufficiently cut, or minced.

The knives $r$ $r'$ are secured to the shafts, on which they are placed, and so as to pass between the studs, or projections $j$ $j$ $j$ in the bottom of the case.

The knives $r$ $r'$ are arranged in straight rows on the shafts, which are so arranged with regard to each other that the knives on one shaft are in a vertical position when those on the other shaft are in a horizontal one. This relative position of the two sets of knives is provided for by placing a projection, $x$, on one of the gear-wheels, which fits into a recess in the other gear.

The studs, or projections may be cast in full rows, or alternately, on each side of the middle of the case, and from top to bottom, or made in a block, separate from the case.

The knives are kept at a proper distance apart on the shafts by means of space-blocks, or rings, but holes may be made through the shafts, and the knives held by means of keys, or pins passing through the holes, or the knives may be laid in the mould, and have the shafts cast in or to them.

The operation is as follows:

The meat is fed into the machine through the hopper, and motion given to the cylinders by turning the crank J.

The screws $o$ $o'$ will carry the meat along to the knives $n$ $n'$, which will carry it over, and cut it against the studs, or projections, $j$ $j$.

These last act a very important part in holding the meat for the action of the knives, and in clearing the spaces between them; for otherwise, the knives would become filled up with meat, and jammed so as not to discharge at all well.

Having thus described my improved meat-cutter,

What I claim as new, and desire to secure by Letters Patent therein, is—

The combination and arrangement of the knives, feed-screws, gear-wheels, studs, and case, all constructed and operating as herein set forth, and for the purpose specified.

JOHN G. PERRY.

Witnesses:
ELISHA C. CLARKE,
HATTIE E. PERRY.